US012763652B2

(12) United States Patent
Schönbauer et al.

(10) Patent No.: US 12,763,652 B2
(45) Date of Patent: Oct. 13, 2026

(54) PRODUCTION DEVICE FOR PRODUCING A COIL OF AN ELECTRIC MACHINE

(71) Applicant: Flender GmbH, Bocholt (DE)

(72) Inventors: Norbert Schönbauer, Bad Füssing (DE); Tobias Strassinger, Thyrnau (DE); Claus Teringl, Pocking (DE); Michael Winklhofer, Pocking (DE)

(73) Assignee: Flender GmbH, Bocholt (DE)

( * ) Notice: Subject to any disclaimer, the term of this patent is extended or adjusted under 35 U.S.C. 154(b) by 679 days.

(21) Appl. No.: 18/029,329

(22) PCT Filed: Sep. 23, 2021

(86) PCT No.: PCT/EP2021/076220
§ 371 (c)(1),
(2) Date: Mar. 29, 2023

(87) PCT Pub. No.: WO2022/069342
PCT Pub. Date: Apr. 7, 2022

(65) Prior Publication Data

US 2023/0369950 A1 Nov. 16, 2023

(30) Foreign Application Priority Data

Sep. 30, 2020 (EP) .................................... 20199130

(51) Int. Cl.
*H02K 15/0414* (2025.01)
*B21D 7/022* (2006.01)
*H02K 3/12* (2006.01)

(52) U.S. Cl.
CPC ......... *H02K 15/0414* (2013.01); *B21D 7/022* (2013.01); *H02K 3/12* (2013.01)

(58) Field of Classification Search
CPC ...... H02K 3/02; H02K 15/04; H02K 15/0414; B21D 7/022; B21D 7/0225; B21D 7/024
See application file for complete search history.

(56) References Cited

U.S. PATENT DOCUMENTS 2,424,024 A * 7/1947 Garton .................. B21D 7/022 72/384
4,427,106 A * 1/1984 Wooldridge ........... B65G 43/02 198/842

(Continued)

FOREIGN PATENT DOCUMENTS

DE 195 29 970 C1 7/1996
DE 102010028869 A1 * 11/2011 .............. H02K 3/12

(Continued)

OTHER PUBLICATIONS

International Search Report issued on Oct. 22, 2021 by the European Patent Office in International Application PCT/EP2021/076220.

(Continued)

*Primary Examiner* — Livius R. Cazan
(74) *Attorney, Agent, or Firm* — Henry M. Feiereisen LLC

(57) ABSTRACT

A device for deflecting a coil includes a preformed body including a first portion configured as a circular arc to rest on the coil for bending, and a second portion adjoining the first portion and configured as a chord to rest on the coil for bending, wherein the first portion and the second portion are interchangeable.

6 Claims, 6 Drawing Sheets

(56) References Cited

U.S. PATENT DOCUMENTS

| | | | | |
|---|---|---|---|---|
| 4,450,708 | A | 5/1984 | King | |
| 5,350,960 | A | 9/1994 | Kiri et al. | |
| 2003/0037585 | A1 * | 2/2003 | Latour | B21D 7/022<br>72/307 |

FOREIGN PATENT DOCUMENTS

| | | | | | |
|---|---|---|---|---|---|
| EP | 1 005 137 | A1 | | 5/2000 | |
| JP | 2010-273486 | A | | 12/2010 | |
| JP | 2013-183543 | A | | 9/2013 | |
| JP | 2013-251995 | | | 12/2013 | |
| JP | 2013-251996 | A | | 12/2013 | |
| JP | 2015-070760 | | | 4/2015 | |
| JP | 2018-098348 | | | 6/2018 | |
| JP | 2019-057975 | | | 4/2019 | |
| KR | 20120053179 | A | * | 5/2012 | B21D 11/10 |

OTHER PUBLICATIONS

Chinese Search Report issued on Apr. 14, 2026 with respect to counterpart Chinese patent application 202180067192.6.

Translation of Chinese Search Report issued on Apr. 14, 2026 with respect to counterpart Chinese patent application 202180067192.6.

* cited by examiner

PRODUCTION DEVICE FOR PRODUCING A COIL OF AN ELECTRIC MACHINE

CROSS-REFERENCES TO RELATED APPLICATIONS

This application is the U.S. National Stage of International Application No. PCT/EP2021/076220, filed Sep. 23, 2021, which designated the United States and has been published as International Publication No. WO 2020/069342 A1 and which claims the priority of European Patent Application, Serial No. 20199130.4, filed Sep. 30, 2020, pursuant to 35 U.S.C. 119(a)-(d).

BACKGROUND OF THE INVENTION

The invention relates to a manufacturing device for a coil for deflecting a coil, wherein a preformed body is provided for the deflection, wherein the preformed body has a first portion which represents a circular arc, and has a second portion which represents a chord.

Electric machines often consist of a stator and a rotor, wherein the stator has stator grooves in which a stator winding is incorporated, and wherein the stator winding has coils.

Stators or stator segments of dynamo-electric machines have coils in particular in a layered laminated core in order to drive a working machine through electromagnetic interaction with a rotor, or to generate electrical energy through the driven rotor. Coils are positioned in grooves of a laminated core of a dynamo-electric machine.

The formation of end windings by the coils (formed or toothed coils) is difficult, particularly in the case of dynamo-electric machines of a large power class (greater than 1 MW). An example of this are generators for wind turbines and tidal power plants, which are used to convert mechanical energy into electrical energy. High-performance motors can be found, for example, in rail motive drives, compressors or pumps.

Electric machines in the higher power range are often designed with so-called preformed coils, as are known, for example, from DE 195 29 970 C1. These are preformed conductor bundles that are wrapped with insulating material, which is usually in the form of strips. To produce a preformed coil, a raw coil is usually first wound and then spread out in such a way that it can be inserted into grooves in the stator.

The coil of a stator winding of an electric machine has, for example, a number of windings that are wound together with a number of layers of mica tape, onto which in turn a number of layers of a cover tape is wound, wherein the coil is designed as a three-dimensional preformed coil.

In the case of coils designed as preformed coils, it is known to first produce a flat coil which, due to its shape, is usually referred to as a race-track loop (two long straight lines which are connected to one another by two semicircular curved portions in particular). This coil is formed into the preformed coil by a forming process. In the case of preformed coils, so-called preformed plates can be used to form the end windings when drawing the coils. However, this is no longer possible with coils with very short winding heads due to machine technology limitations, and an optimal/clean winding head shape is no longer given or cannot be manufactured without plates, A further problem can arise from drawing, if this causes the individual windings of a coil to move away from each other again.

JP 2013 251 995 A discloses a manufacturing device for a coil which provides a preformed body for deflecting a coil, wherein the preformed body has a first portion which represents an circular arc, and a second portion which represents a chord. The preformed body for bending the coil is circular In the region in which the coil to be shaped or its windings rest thereon. In the region where there is no coil or winding resting thereon, as shown in FIGS. 4 to 8, said preformed body is straight or configured as a chord. Drawing coils shaped in this way to the end windings can result in a bulbous convexity, which should actually be avoided.

Proceeding from this, it is therefore an object of the invention to enable improved drawing of the preformed coil with reduced bulging or spreading.

SUMMARY OF THE INVENTION

A solution to the problem results from a manufacturing device as set forth hereinafter. A further solution to the problem results from a method as set forth hereinafter. A further solution to the problem results from a stator as set forth hereinafter. Design embodiments of these solutions also result according to one of the variants of design embodiments described below in the description.

In a manufacturing device for a col, for deflecting a con, a preformed body is provided for the deflection, wherein the preformed body has a first portion which represents a circular arc, and a second portion which represents a chord, wherein both portions are provided for resting thereon the coil. The first portion and the second portion are provided so that the coil is guided on these during bending and the coil finally rests against the first portion and the second portion as a result of the bending. The coil is bent in particular at an angle of 180°, i.e. in such a way that the coil can be inserted into a first groove of a stator of an electric machine and can also be inserted into a further groove. In this way, the coil can be guided to an end face of the stator and returned after being deflected by 180°. The deflection of the coil on an end face of the laminated core of the stator forms a winding overhang.

According to the invention, the first portion is provided for resting thereon the coil, and the second portion is also provided for resting thereon the coil. The first portion and the second portion adjoin each other. The first portion and the second portion have a height that is at least equal to the height of the coil.

In a preferred embodiment, a manufacturing device according to the invention for a coil is characterized in that the first portion has a circumferential angle of between 80° and 120°, preferably between 90° and 110°, particularly preferably approximately 105°, and the second portion has a circumferential angle of between 90° and 130°, preferably between 100° and 120°, particularly preferably approximately 115°. These dimensions give particularly good results when bending to form the winding head and prevent the individual layers from spreading. The circle chord preforms the end winding. The chord in the preformed body is advantageous if no plates can be used in the forming.

The same applies to a further embodiment of a preformed body according to the invention, which is aligned during bending of the coil so that the chord of the second portion in relation to the coil longitudinal direction has an angle of between 5° and 45°, preferably between 10° and 30°, more preferably between 15° and 25°, particularly preferably approximately 20°. It is unimportant how the preformed body is designed where there are no windings or other coil elements in contact during bending. It is only relevant that where the windings or the coil elements are in contact, there is first a circular shape (a piece of a circle or a circle segment) and then a subsequent straight line for forming the favorable shape. It is also possible that there is first a straight line (a piece of straight line) followed by a piece of a circle (circle segment).

The production device makes it possible to achieve a short end windings length using a winding tool (preformed body) for preforming preformed coils. Shorter electric machines can be built by shortening the end windings length. This is advantageous, for example, in wind power generators or in ship propulsion systems. The winding tool (preformed body) with the different portions for resting thereon the coil during bending also makes it possible to pre-bend a coil in such a way that when the coil is subsequently drawn to the desired shape of the winding head, the windings of the coil are spread apart in the region of the winding head can be reduced at least, With a preformed body (winding tool) that is not round, as with standard winding, but with a preformed body that has a slope (chord), the drawing of the coil can be positively influenced. This slope pre-shapes the part of the coil before it is drawn during winding, and thus replaces solutions to problems such as tapping windings of the coil to size. After drawing, the shape of the end windings corresponds in particular to that of a coil that was manufactured or should have been manufactured with preformed plates, without generating any additional effort.

According to a method for producing a coil, wherein the coil has a multiplicity of windings, the coil is bent over a preformed body, wherein a first portion is formed, which represents an circular arc, and a second portion is formed, which represents a chord. In the case of the coil, the first portion is formed and the second portion is formed by the preformed body. In particular, the first portion and the second portion follow one another directly. The coil thus forms the shape of the preformed body.

According to one design embodiment of the method, the preformed body has a first preformed body portion, which represents an circular arc, and a second preformed body portion, which represents a chord. The shape of the preformed body and the shape of the shaped (bent) coil correspond to each other.

In one embodiment of the method, the coil is drawn in such a manner that the coil in the second portion with a chord shape has windings of which the mutual spacing is smaller than a mutual spacing with a circular arc shape in the second portion. This circular arc shape in the second portion represents the known production. In the known production, the first portion and the second portion are configured as circular arcs, wherein both circular arcs form a common circular arc, and thus there are actually no two portions and they are also not known.

Due to the second portion with the shape of a chord, the windings of the coil no longer bend as a result of the drawing, as in a predefined circular arc shape of the coil before the drawing. This allows the end windings to be made more compact, for example, Insulating the coil is also made easier in the region of the end windings.

In one embodiment of the method, a continuous gradient is formed by the coil, by being drawn, in the region of the end windings. This is due to the fact that the windings at least no longer spread out as much. The slope results from a radial view from the inside to the outside.

When carrying out the method, one of the production devices described is used in particular.

A stator of an electric machine has a coil which is pre-bent in the shape of a circular arc and a chord. Such a pre-bent or preformed coil is used in the manufacture of the stator. The use of coils of this type results in improved production of the winding overhang of the electric machine. To produce the end windings, the pre-bent (preformed) coils are drawn. To produce the electric machine, coils are used in particular, which are prefabricated according to one of the methods described.

BRIEF DESCRIPTION OF THE DRAWING

The invention and further advantageous configurations of the invention are explained in more detail below on the basis of exemplary embodiments presented in principle. It is shown in.

DETAILED DESCRIPTION OF PREFERRED EMBODIMENTS

Figure 1:
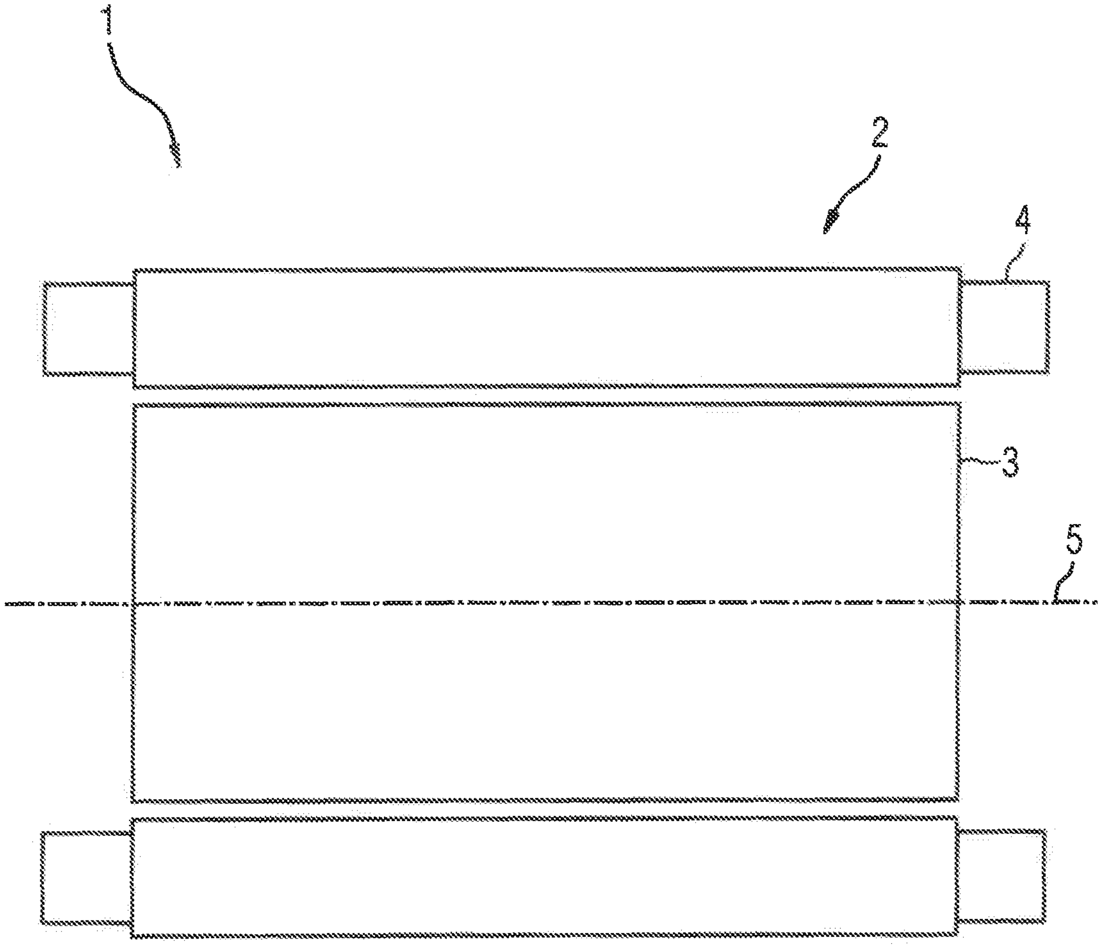
FIG. 1 an electric machine.

The illustration according to FIG. 1 shows an electric machine 1 which has a stator 2 and a rotor 3. The stator 2 has end windings 4. The rotor 3 is rotatably mounted about an axis 5.

Figure 2:
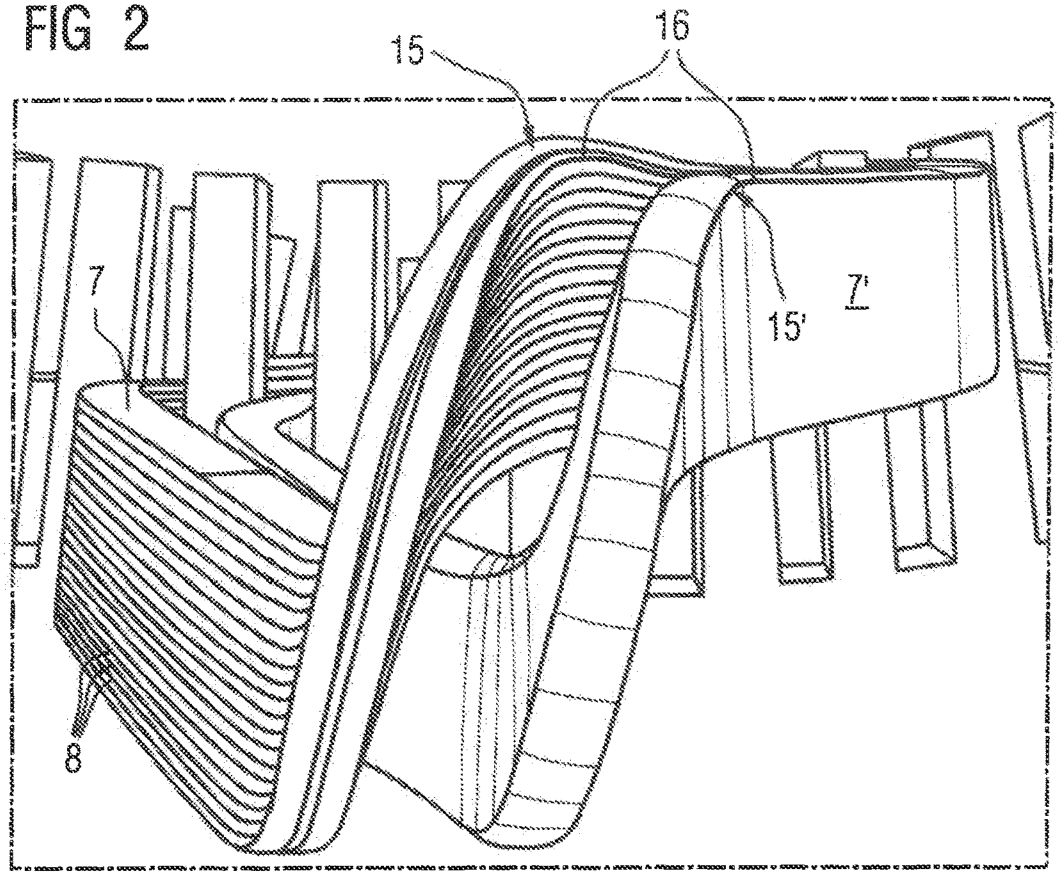
FIG. 2 a coil which is preformed by means of a circular preformed body.

The illustration according to FIG. 2 shows coils 7, 7' according to the prior art, which serve to form a winding head. The coils 7, 7' have windings 8. In particular, tapes are used for the windings 8. The coil 7 does not yet have a bandage. The coil 7' does have a bandage, so it is bandaged, it being pointed out that the invention works with and without bandaging. Drawing the coil 7, 7' towards the end windings results in a bulbous convexity 15, 15' which should be avoided. The convexity 15, 15' can also be recognized by the plotted contours 16. With the convexity, there is also a spreading of the windings 8 in this region. The convexity mentioned here takes place at 15 and 15' in the direction of the groove (in FIG. 2 on the right along the coil along the "straight" part of the end windings).

Figure 3:
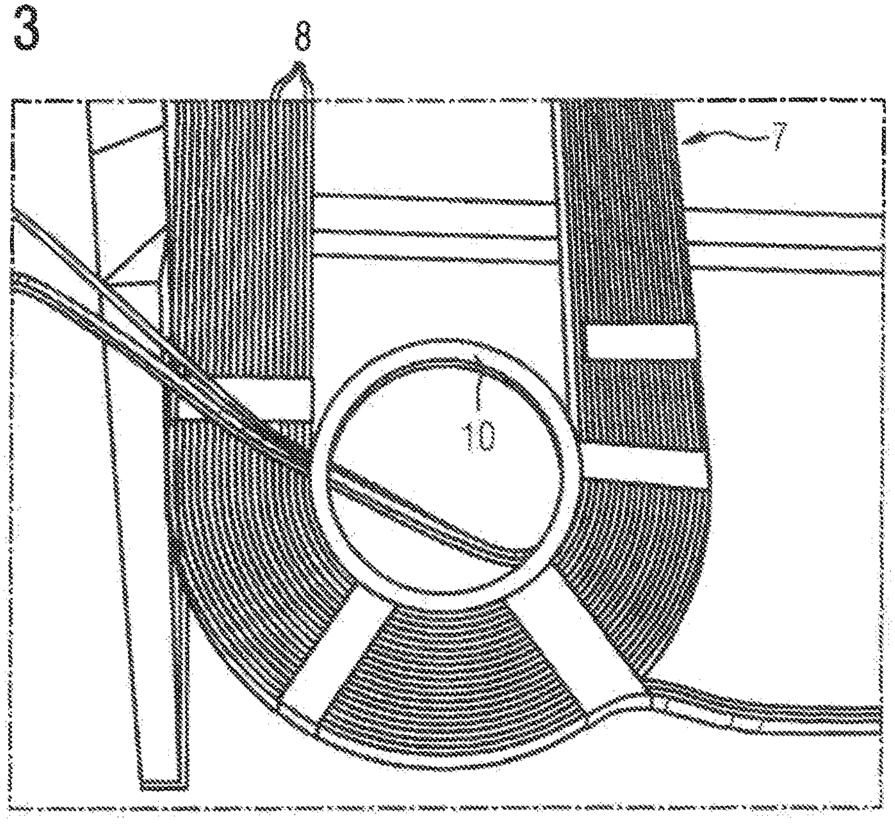
FIG. 3 a circular preformed body.

The illustration according to FIG. 3 shows symbolically how the coils 7, 7' were prefabricated in the prior art according to FIG. 1. FIG. 3 symbolizes a circular preformed body 10. The coil 7 is bent in a known manner about a circular preformed body 10 of this type. The coil 7 is guided (deflected) about the preformed body 10.

Figure 4:
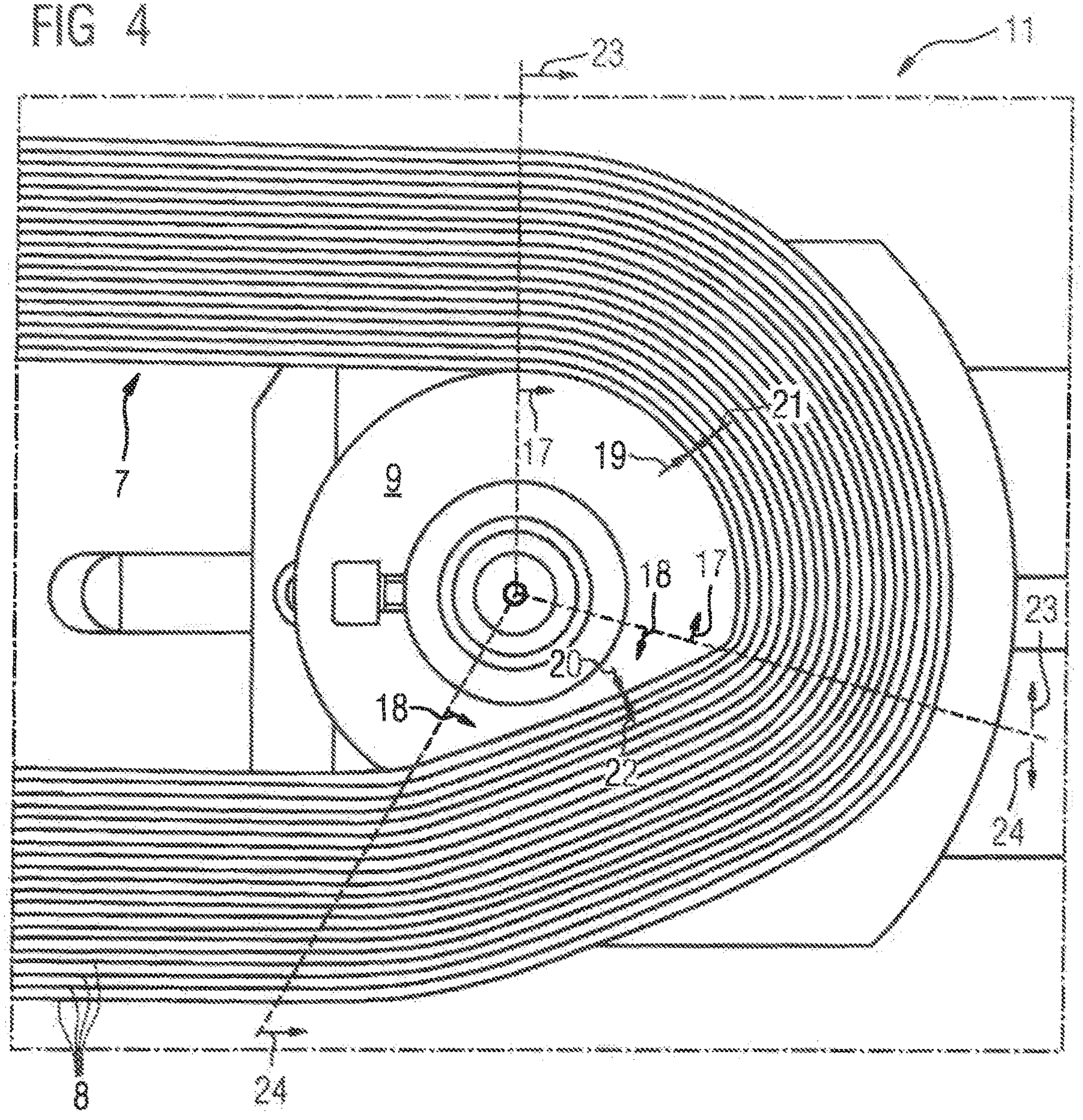
FIG. 4 a manufacturing device.

In contrast to FIG. 3, the illustration according to FIG. 4 now shows the procedure according to the invention or the preformed body 9 according to the invention. This also applies in an analogous manner to FIG. 5. The preformed body 9 has a circular arc 19 and a (here adjoining) chord 20 in the region on which the coil is applied during bending. Since the coil 7 is bent over the preformed body 9, the coil 7 also has a corresponding arc 21 and a corresponding chord 22. This results in a first portion 23 and a second portion 24 for the coil 7 and a first portion 17 and a second portion 18 for the preformed body 9.

It is easy to see that here the first portion 17 has a circumferential angle of 105° and the second portion 18 has a circumferential angle of 115°, These angles determine the shape of the coil 7 produced, while the region on the left in FIG. 4, which does not play a role in bending, can be of any shape. It is round in shape here, but could also be shaped differently.

It can also be seen that the preformed body 9 when bending the coil 7 is aligned so that the chord 20 of the second portion 18 is at an angle of 20° with respect to the longitudinal direction of the coil—as here in FIG. 4. 20° is here, by way of example, the angle between the chord 20 and the horizontal, which Indicates the direction of the main axis of the coil. The preformed body 9 is thus installed "asymmetrically" in the sense that the windings 8 emanating from the top left are formed first on the circular arc 19, and then formed immediately on the adjoining chord 20, lying obliquely below, so as to run on in a more or less straight manner until said windings 8 at the bottom left run straight again in the main direction or the main axis of the coil. The half-curved and half-straight preformed coil element with a circular arc 21 and a chord 22 is particularly well suited for further shaping into the end windings.

Figure 5:
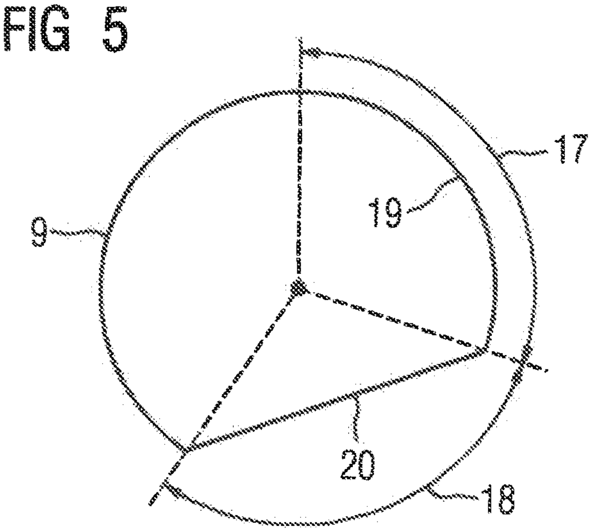
FIG. 5 a preformed body with a segmented shape.

The illustration according to FIG. 5 shows the preformed body according to FIG. 4 in a schematic form with the circular arc 19 in the first portion 17 and the chord 20 in the second portion 18. The circular arc 19 is located in a first portion 17, i.e. the first preformed body portion. The chord 20 is located in a second portion 18, i.e. the second preformed body portion.

Figure 6:
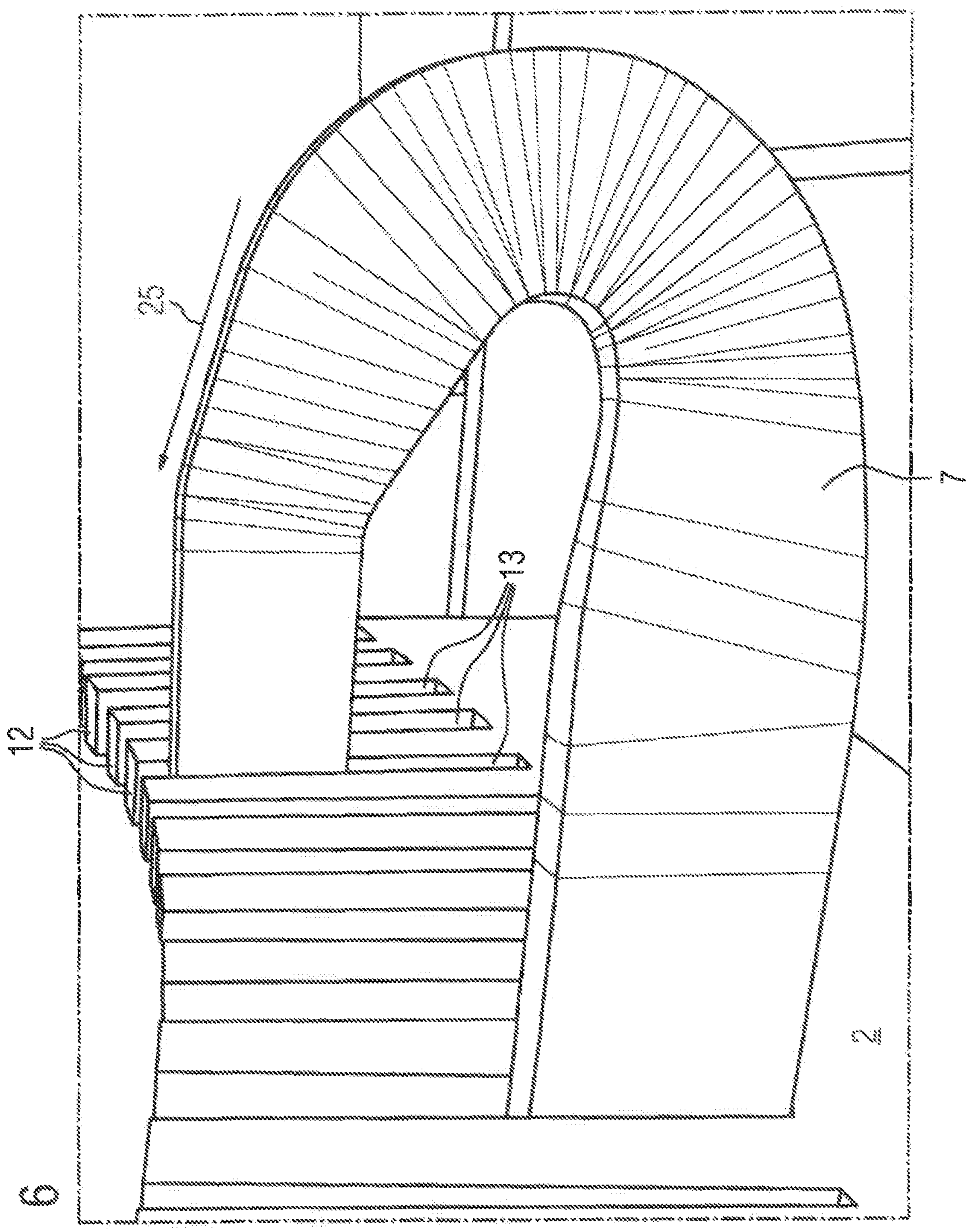
FIG. 6 a coil which is preformed by means of a preformed body with a segmented shape.

The Illustration according to FIG. 6 shows a coil 7 which is bandaged. The coil 7 is placed in grooves 13, wherein the grooves 13 are configured by teeth 12. The coil 7 according to FIG. 6 is preformed by means of a preformed body which has a chord and a circular arc.

Figure 7:
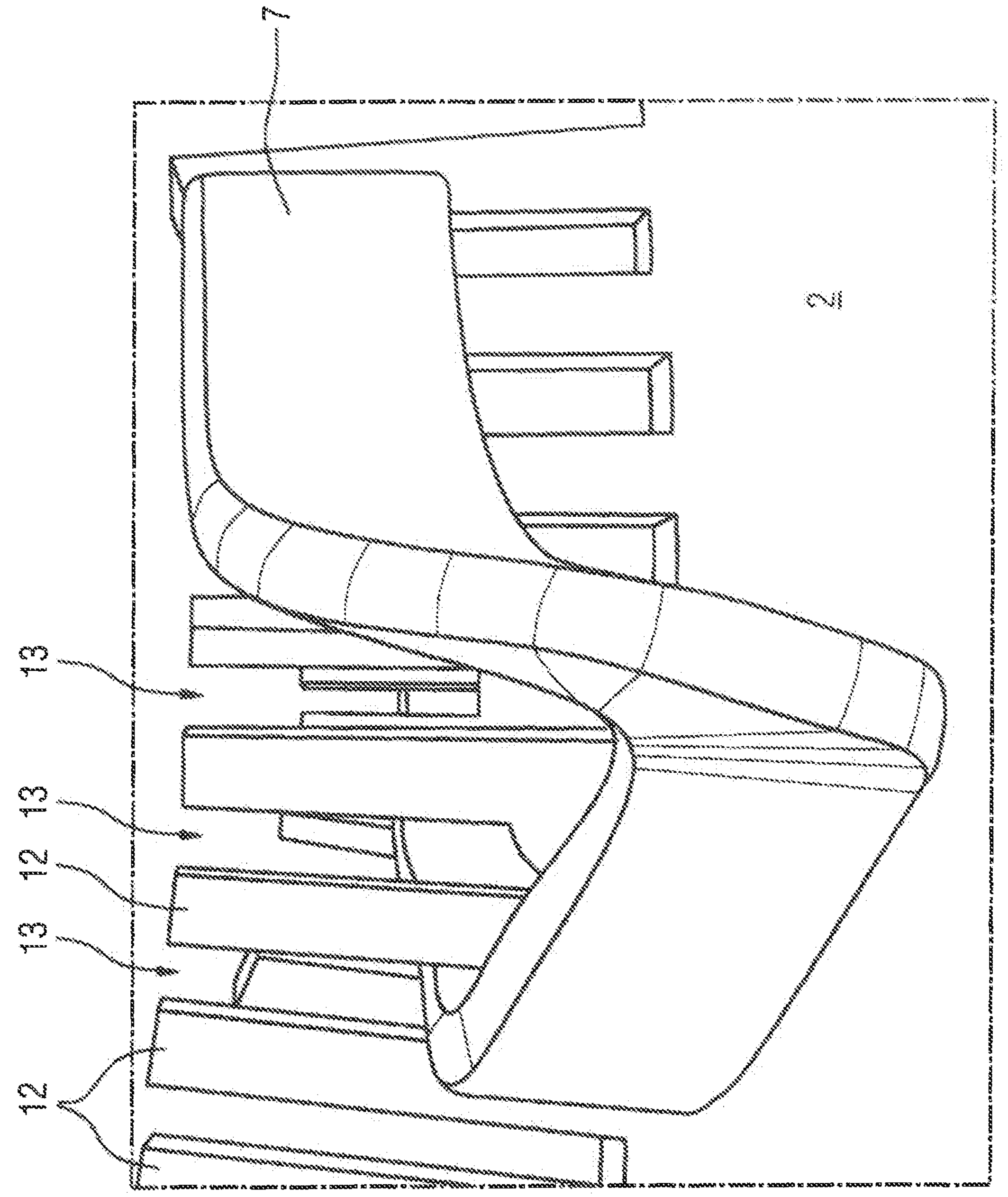
FIG. 7 a further coil which is preformed by means of a preformed body with a segmented shape.

The illustration according to FIG. 7 shows the coil 7 according to FIG. 6 from a different perspective.

Figure 8:
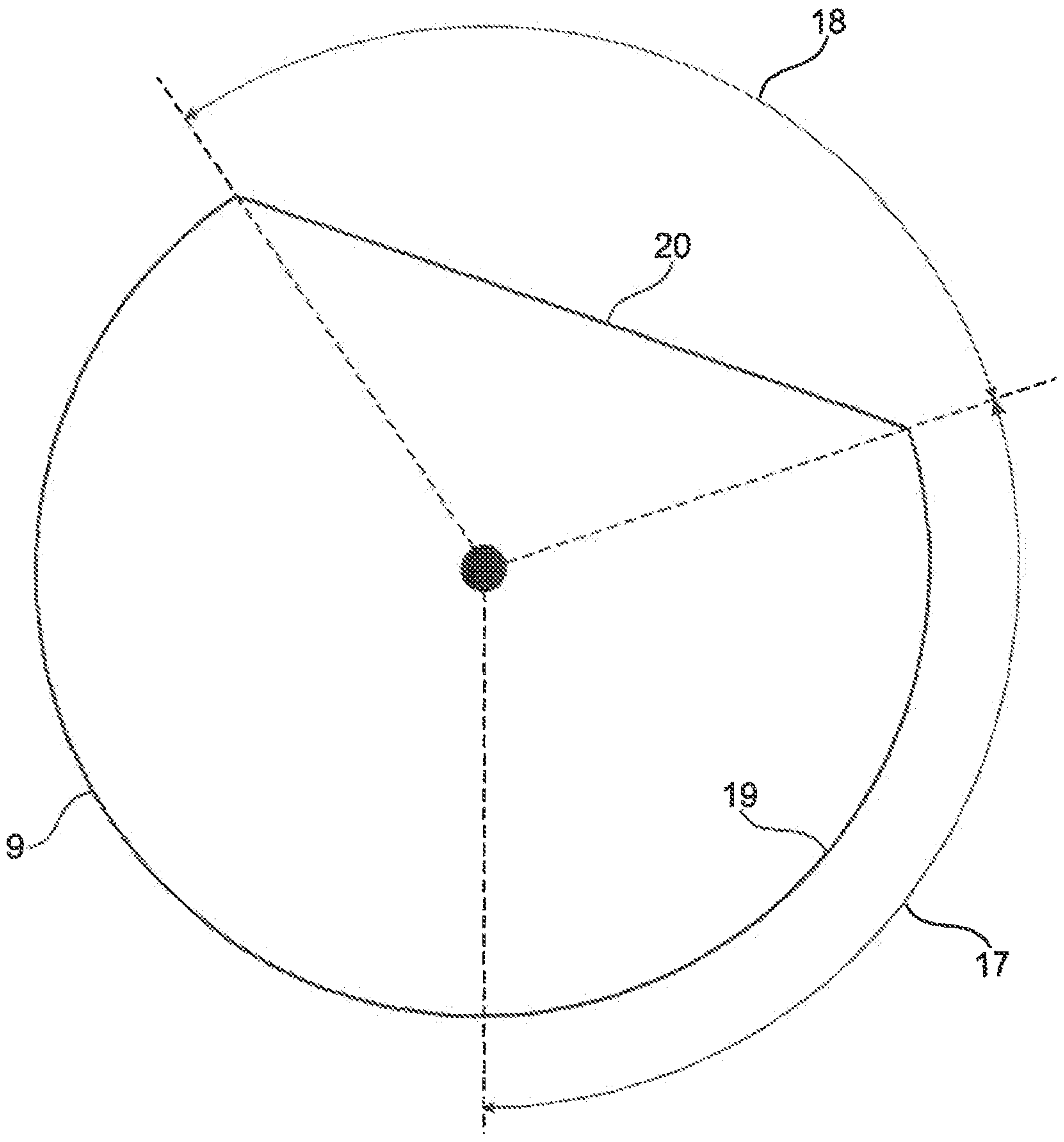
FIG. 8 a further preformed body.

The illustration according to FIG. 8 shows a further preformed body 9 which can be used in the invention. This preformed body 9 in schematic form is constructed as a mirror image of the preformed body 9 of FIG. 5, with the first portion 18 and the second portion 17 being reversed in their order. It has a circular arc 19 in the second portion 17 and a chord 20 in the first portion 18. The circular arc 19 is located here in the second portion 17, the second preformed body portion. The chord 20 is located in the first portion 18, the first preformed body portion.

The invention claimed is:

1. A method for producing a continuous coil having longitudinal axis and a multiplicity of windings, the method comprising providing a shaped body having a first portion configured as a circular arc with end points which subtend a circumferential angle of between 80° and 120° with respect to a center point of the circular arc, and a second portion configured as a chord contiguously extending from the circular arc at one of the end points and subtending a circumferential angle of between 90° and 130° with respect to the center point of the circular arc, wherein the chord of the second portion of the shaped body is aligned in relation to the coil longitudinal direction at an angle of between 5° and 45°, starting with the windings extending in a first direction parallel to the longitudinal axis, bending the windings over the shaped body such that a first section of the windings is urged against the first portion, and a second section of the windings is urged against the second portion, and pulling a free end of the second section in a second direction parallel to the longitudinal axis opposite the first direction, thus producing the coil with multiple windings that is preformed by means of the shaped body commensurate with the chord and the circular arc.

2. The method of claim 1, further comprising forming the coil such that the coil formed from the second section of the windings in the second portion with a chord shape has windings at a mutual spacing which is smaller than a mutual spacing of the windings that would exist when the second portion had a circular arc shape.

3. The method of claim 1, further comprising forming the coil such that the coil forms a continuous gradient in a region of end windings of the windings.

4. The method of claim 1, wherein the chord of the second portion of the shaped body is aligned in relation to the coil longitudinal axis at an angle of between 10° and 30°.

5. The method of claim 1, wherein the chord of the second portion of the shaped body is aligned in relation to the coil longitudinal axis at an angle of between 15° and 25°.

6. The method of claim 1, wherein the chord of the second portion of the shaped body is aligned in relation to the coil longitudinal axis at an angle of approximately 20°.

* * * * *